United States Patent [19]

Rohrbach

[11] Patent Number: 4,917,956

[45] Date of Patent: Apr. 17, 1990

[54] METHOD OF PREPARING CYCLODEXTRIN-COATED SURFACES

[75] Inventor: Ronald P. Rohrbach, Forest Lake, Ill.

[73] Assignee: UOP, Des Plaines, Ill.

[21] Appl. No.: 217,506

[22] Filed: Jul. 11, 1988

[51] Int. Cl.[4] .................. B32B 23/04; B32B 23/06; B32B 23/08

[52] U.S. Cl. .................. 428/423.1; 428/533; 428/425.1; 428/446; 428/532; 427/385.5

[58] Field of Search .................. 428/532, 533, 425.8, 428/425.6, 425.5, 425.1, 423.1

[56] References Cited

U.S. PATENT DOCUMENTS 3,472,835  10/1969  Buckler et al. .................. 260/209

OTHER PUBLICATIONS

J. Szejtli, Starch, 34, 379–385 (1982).
J. Chromatography, 194, 153, (1980) and 208, 35 (1981).
Bull. Chem. Soc. Jpn., 54, 2478 (1981) and 55, 2611 (1982).

Primary Examiner—Marion C. McCamish
Assistant Examiner—Elizabeth M. Cole
Attorney, Agent, or Firm—Thomas K. McBride; Eugene I. Snyder

[57] ABSTRACT

Polyisocyanate crosslinked cyclodextrin resins prepared within a certain mole ratio of polyisocyanate to cyclodextrin are soluble in solvents such as pyridine and dimethylformamide but highly insoluble in water. Such resins have excellent adhesive properties toward virtually all solid surfaces which consequently can be readily coated with a thin film having a multiplicity of cyclodextrin moieties available at the surface for separation and/or purification. Such coated substrates can be prepared in a variety of sizes, shapes, and cyclodextrin loading quite conveniently and relatively inexpensive.

33 Claims, No Drawings

METHOD OF PREPARING CYCLODEXTRIN-COATED SURFACES

BACKGROUND OF THE INVENTION

Cyclodextrins are cyclic molecules consisting of 1-4 linked alpha-D-glucopyranose monomeric units. The cyclodextrins containing 6-, 7-, and 8-glucose units joined to form a ring, commonly known as alpha-, beta-, and gamma-cyclodextrin, respectively, are the most important cyclodextrins to date, possibly because of their availability relative to cyclodextrins of different ring size. The usefulness of these cyclodextrins arises from their ability to reversibly form inclusion complexes, or clathrates, with many types of compounds. Inclusion complexes arise when a host molecule, such as a cyclodextrin, has a structure containing an interior cavity into which guest molecules can bind by weak interactions such as van der Waal's forces. The latter are short range forces which are sufficiently strong to allow the formation of definite, generally solid complexes, but are sufficiently weak to permit ready dissociation of the complex to a host and guest molecule.

The cyclodextrins are doughnut-shaped molecules with an interior cavity whose size and shape is determined by the number of glucose units that make up the ring. In alpha-cyclodextrin the almost cylindrical cavity is approximately 7 angstroms deep and 5 angstroms in diameter. In beta-cyclodextrin the depth is the same but the diameter is 7 angstroms, and in gamma-cyclodextrin cavity is again 7 angstroms deep but is 9 angstroms in diameter. Cyclodextrins are soluble in water because of the many hydroxyl groups of the glucose subunits that surround the rim of the cavity. However, the interior of the cavities themselves is hydrophobic, and these hydrophobic cavities extract organic molecules from aqueous solution if the organic materials have the correct shape and hydrophobic character.

The complexing ability of cyclodextrins lends itself to various uses. For example, the cyclodextrins are used in encapsulating desirable flavors and fragrances which can then be stored for reasonably long periods of time and added to foods at their preparation. Reciprocally, cyclodextrins may be used in removing undesirable flavors and fragrances from food by complexing with them. Cyclodextrins also are used in the protection of foods against oxidation, photochemical degradation, and thermal decomposition. These and other uses have been summarized by J. Szejtli, *Starch*, 34, 379–385 (1982).

Although in some applications the use of the water soluble cyclodextrins themselves is appropriate, in other cases it is more desirable to employ an insolubilized cyclodextrin to more readily enable its extended use or to enable its incorporation in a continuous process. For example, when cyclodextrins are employed for their ability to separate various components, as in gas phase chromatography or high pressure liquid chromatography, the water soluble cyclodextrins have obvious limitations and some sort of solid phase incorporating cyclodextrins is needed. Another example is the use of cyclodextrins to remove bitter components in citrus juice where it is desired to pass the juice over a solid bed incorporating cyclodextrins to give an effluent of reduced bitterness.

These needs previously have been recognized, and one general solution is the preparation of polymeric cyclodextrin derivatives as resins having properties appropriate for a solid support in chromatographic applications or for use as a fixed bed in continuous processes. Buckler et al. in U.S. Pat. No. 3,472,835 recognized the need for insolubilized cyclodextrins as "molecular sieves" in the separation and purification processes and offered as a general solution insoluble derivatives prepared from the reaction of cyclodextrins with compounds having at least two hydroxyl-reactive functional groups per molecule. The patentee disclosed a large class of suitable polyfunctional compounds, including isocyanates, and exemplified several insoluble polymeric cyclodextrin derivatives suitable for use in numerous described applications.

More recently Mizobuchi prepared and tested cyclodextrin polyurethane resins as gas phase chromatographic columns (*J. Chromatography*, 194, 153 (1980); ibid., 208, 35 (1981)) in the separation of numerous classes of materials, including aromatic amino acids, and as sorbents for low molecular weight organic vapors (*Bull. Chem. Soc. Jpn*, 54, 2478 (1981)) and aromatic compounds in water (ibid., 55, 2611 (1982)). The resins generally were prepared by reacting at 80°–115° C. a cyclodextrin with from about 3.5 to about 12.6 molar proportions of a diisocyanate in pyridine or dimethylformamide as a solvent, then precipitating the formed resin with a large excess of methanol or acetone. In some cases the unreacted hydroxyl groups in the resins were then silanized. The isocyanates used were hexamethylene diisocyanate, 1,3-bis(isocyanatomethyl)cyclodexane, and 1,3-bis(isocyanatomethyl)benzene.

As useful as the polymeric resins themselves as the solid adsorbent, they have limitations arising from porosity and transport characteristics. That is, the size and number of the channels in the solid resins limit transport of species in solution to available cyclodextrin sites, which restricts the efficiency of separation. It was reasoned that such limitations would be appreciably relaxed, if not removed, if the cyclodextrin polymer was presented as a thin film. Polyurethane cyclodextrins have desirable features from other aspects, which led us to develop a method for making coatings of cyclodextrins crosslinked with polyfunctional isocyanates. In this application there is described a method for making such coatings. The method is extraordinarily versatile, almost approaching universality, and can be used to coat materials as diverse as ceramics, fabrics, metals, paper, wood, and glass.

SUMMARY OF THE INVENTION

The purpose of this invention is to prepare articles coated with a polymeric cyclodextrin suitable for use, for example, in separation and purification processes where an insolubilized cyclodextrin is needed. One aspect of our invention is a method of coating a solid substrate with a polyisocyanate crosslinked cyclodextrin. An embodiment comprises contacting a substrate with a solution of a polyisocyanate crosslinked cyclodextrin in a non-polar aprotic organic solvent and depositing a film of the crosslinked cyclodextrin after evaporation of the solvent from the wetted substrate, where the crosslinked cyclodextrin is the reaction product of cyclodextrin with from about 1.3 to about 1.9 molar proportions of toluene diisocyanate. In a more specific embodiment the substrate is a ceramic. In a still more specific embodiment the cyclodextrin is beta-cyclodextrin and the crosslinker is toluenediisocyanate. In yet another specific embodiment the crosslinked cyclodextrin arises from reaction in pyridine as a solvent. Another aspect of our invention is the coated substrate itself. Other embodiments will be apparent from the ensuing description.

DETAILED DESCRIPTION OF THE INVENTION

The invention herein is based on several key discoveries. One is that in the reaction of cyclodextrins with polyisocyanates, especially diisocyanates, the solubility characteristics of the reaction product varies with the molar ratio of diisocyanate to cyclodextrin. In particular, at low values of this ratio the crosslinked product is soluble in both water and the dipolar aprotic solvent in which the homogeneous reaction is conducted. As this ratio increases, i.e., as the product becomes more highly crosslinked, the product becomes insoluble in water while maintaining its solubility in certain dipolar aprotic solvents. With still further increases in the ratio the product becomes insoluble in both water as well as the dipolar aprotic solvents. But it is important to note that there is a window, often a narrow one, where the crosslinked cyclodextrin is insoluble in water but soluble in the organic solvent used. For the purposes of this invention, a suitable polyisocyanate crosslinked cyclodextrin resin has a water solubility at 25° C. of less than 200 ppm, but has a solubility at 25° C. in a dipolar aprotic solvent of at least 0.1 weight percent.

The second important observation is that the crosslinked cyclodextrin formed in the aforementioned "window" adheres readily to virtually any surface, thereby providing a thin film of uniform thickness of a cyclodextrin containing polymer. A consequence of this is that such a polyisocyanate crosslinked cyclodextrin resin may be deposited on any surface and may be almost literally painted onto the surface. Consequently such a coated surface is easy to prepare with a uniform film thickness. The coatings have good adhesive qualities and chemisorption is unnecessary for its binding. Such coated surfaces have several distinct advantages over discrete particles of the resins themselves. One advantage is the simplicity of the composition and its preparation, both of which lead to substantial reduction in cost and time of preparation. Another advantage is that a coated substrate may be prepared from a virtually unlimited number and nature of solid phases in a variety of forms and shapes. Still another advantage is that coated surfaces can be prepared with a uniform thickness of cyclodextrin resins. Yet another important advantage is that if, for whatever reason, the coated cyclodextrin is deactivated it can be readily stripped or removed and the substrate can be reused, a characteristic particularly important where the substrate is relatively expensive.

The substrate which is coated in this invention can be virtually any solid phase material. Both hydrophilic and hydrophobic surfaces may be coated, and solids of any shape or size may be utilized. The porosity of the surface is not material as regards its ability to be used in the practice of this invention, although other considerations may dictate sometimes a porous and sometimes a nonporous solid. Because of the excellent adhesive properties of the resin a virtually unlimited range of solid substrates can be used, as for example ceramics, glass, plastics, metals, fabrics, and cellulosic products. A class of substrates having particularly desirable properties for use in fixed beds are refractory inorganic oxides, and especially porous inorganic oxides, such as alumina, titania, silica, magnesia, boria, thoria, zirconia, and combinations thereof. Both alumina and silica are especially favored. Among the cellulosics paper, wood, and other wood fabrics are readily used as substrates in the practice of this invention. For example, paper can be coated with the resins of this invention for subsequent use in thin layer chromatography.

The substrate is then coated with a polyisocyanate crosslinked cyclodextrin resin. Among the polyisocyanates diisocyanates are favored. A broad variety of polyisocyanates may be used in the practice of this invention and may be exemplified by such materials as the toluene diisocyanates, p- and m-phenylene diisocyanate, tetramethylene diisocyanate, 1,6-hexamethylene diisocyanate, 1,4-cyclohexylene diisocyanate, 4,4'-methylenedicyclohexyl diisocyanate, 4,4'-methylenediphenyl diisocyanates, 3,3-dimethyl-4,4-diphenylmethane diisocyanate, 1,5-tetrahydromethylene diisocyanate, dianisidine diisocyanate, bitolylene diisocyanate, naphthalene-1,4-diisocyanate, bis(2-methyl-3-isocyanatophenyl)methane, bis(3-methyl-4-isocyanatophenyl)methane, 4,4'-diphenylpropane diisocyanate, and the methylene-bridged polyphenyl polyisocyanates such as are described and discussed in U.S. Pat. No. 4,432,067, especially the polyisocyanates based on methylenediphenyl diisocyanates and the uretonimine modified MDI as described therein. It is to be emphasized that the foregoing polyisocyanates are merely illustrative of those which can be used in the practice of this invention. Among the polyisocyanates the use of the toluene diisocyanates (TDI) and methylenediphenyl diisocyanate (MDI) are particularly preferred.

Not any polyisocyanate crosslinked cyclodextrin resin is adequate for the successful practice of this invention, and the solubility of the resin as described below is an essential feature of the invention. In general, a solution of the cyclodextrin is reacted with a suitable polyisocyanate to afford the crosslinked resin. Because of their limited solubility in most nonaqueous organic solvents, the cyclodextrin is dissolved in a dipolar aprotic solvent such as pyridine, dimethylformamide, dimethylsulfoxide, N-methylpyrrolidone, hexamethylphosphoramide, and dimethylacetamide, with the use of pyridine, dimethylformamide, and, to a lesser extent, dimethylsulfoxide highly recommended. Cyclodextrin is then reacted with a polyisocyanate in an amount effective to afford a crosslinked cyclodextrin resin which is insoluble in water but which is not so highly crosslinked as to become insoluble in the organic solvent in which the reaction is conducted. Quite typically the reaction is carried out at a temperature in the range of 130°–140° C. for a time between 20–30 minutes, but reaction conditions are not critical and can be varied within wide limits as is readily determined by one skilled in the art with a minimum of experimentation. Either alpha-, beta-, or gamma-cyclodextrin may be employed in the practice of this invention. Modified cyclodextrins also may be used, although not necessarily with equivalent results.

The polyisocyanate and cyclodextrin are reacted in relative amounts to afford a crosslinked resin soluble in the organic solvent, without any gel formation, while being insoluble in water. By "soluble" is meant a solubility at about 25° C. of at least 0.1 weight percent; by "insoluble in water" is meant a solubility at 25° C. less than about 200 ppm. The relative amounts of polyisocyanate and cyclodextrin will depend mainly on the particular polyisocyanate and cyclodextrin used, but nonetheless is readily determined through simple experimentation, as described in detail below. Briefly, to aliquots of a solution of cyclodextrin is added polyisocyanate in differing molar proportions until a gel forms of the resin. The latter represents the upper limit of polyisocyanate which can be used. Crosslinked resin is then isolated from reaction mixtures in which a lesser amount of polyisocyanate was used and tested for water solubility. The point at which the resin is water soluble represents the lower limit of polyisocyanate which can be used. Where beta-cyclodextrin is used with toluene diisocyanate it has been found that a suitable reaction product results from using from about 1 to about 2.5 molar proportions of polyisocyanate, preferably from about 1.3 to about 1.9 molar proportions. Where beta-cyclodextrin and 4,4'-methylenediphenyl isocyanate are used a suitable product results from using about 0.3 to about 1.3 molar proportions of the isocyanate, preferably from about 0.45 to about 1.10 molar proportions. But it needs to be emphasized that the effective amount of polyisocyanate needed to form a suitable product for use in this invention will vary with both the polyisocyanate and cyclodextrin used, but nonetheless can be easily determined through routine experimentation.

As commented on above, the polyisocyanate is used in that window of molar proportion which gives a product insoluble in water but remaining soluble in the dipolar aprotic organic solvent used for the reaction. When the reaction is complete the resin is precipitated most simply by the addition of water to the cooled reaction mixture. Other materials which can be used as precipitants, although not necessarily with equivalent results, include low molecular weight alcohols up through about hexanol, aliphatic ketones containing up to about 6 carbon atoms, and aromatics such as benzene, toluene, and so forth. However, in some of these cases the solid which precipitates may have the solvent included within the cyclodextrin cavity, and precipitation of the inclusion product may not be desirable.

The polyisocyanate crosslinked cyclodextrin as obtained above may then be dried and conveniently stored as a powder. Although the reaction product mixture can be used directly to coat substrates, it is far more convenient to prepare and isolate the solid resin and store it as a powder until used. For use in coating the substrate the powder is then redissolved in the same class of solvents as is used in its preparation, i.e., dipolar aprotic solvents. Thus, pyridine and dimethylformamide, and to a lesser extent dimethylsulfoxide, are preferred solvents but n-methylpyrrolidone, hexamethylphosphoramide, and dimethylacetamide also may be used. Normally solutions are prepared containing at least 0.1 weight percent resin, but most often contain from about 0.5 to about 5 weight percent of the cyclodextrin resin.

The substrate may be spray coated, dip coated, or coated by any other convenient method. What needs to be done is to contact the solution of the cyclodextrin resin with the substrate. The wetted substrate is then allowed to drip dry in order to remove excess solution, and solvent is subsequently removed from the wetted substrate as by evaporation. Generally the coating of the cyclodextrin resin will be from about 0.1 to about 10.0 weight percent of the final dried material. This range is not a limitation of the method, but instead represents practical limits. If a substrate is coated with less than about 0.1% of the resin there is too little cyclodextrin present for use in typical separation or purification processes, that is, the coated substrate will have too low of a capacity. On the other hand, if the coating is greater than about 10 weight percent then the film of cyclodextrin resin becomes too thick and its efficiency is reduced. However, it needs to be reemphasized that the percentage range expressed merely reflects practical considerations rather than any limitations inherent in the method itself.

The following examples are illustrative of my invention and do not limit it in any way. The use of beta-cyclodextrin and toluene diisocyanate in these examples are only representative of the cyclodextrins and polyisocyanates, respectively, which can be successfully employed in the practice of this invention.

EXAMPLE I

Synthesis of Toluene Diisocyanate Beta-cyclodextrin Paint

A series of crosslinked beta-cyclodextrin oligomers were synthesized in which the ratio of crosslinking agent to cyclodextrin was varied and the physical properties of each oligomer were measured. A well dried 1.0 gram sample of beta-cyclodextrin (BCD) was dissolved in 5 mL of previously dried dimethylformamide (DMF) and heated almost to the boiling point. To a series of these identically prepared reaction vessels was added different amounts of toluene diisocyanate (TDI) 80/20 mixture of 2,4-/2,6-isomers. This reaction was continued for twenty minutes with mixing after which the reaction mixture was poured into ice water and the products were separated by filtration. The precipitated material was washed several times in acetone to remove any residual DMF included within the cyclodextrin. The resulting solid was finely ground and dried and its physical characteristics (pyridine solubility) and binding ability were measured.

The ability of crosslinked cyclodextrins to form inclusion complexes with guest molecules was measured by the ability of the powdered cyclodextrin to remove phenol from an aqueous solution. In this standard test a 0.1 g sample of the cyclodextrin powder was contacted with a stock solution containing 200 ppm phenol. This solution was allowed to come to equilibrium for several hours with or without shaking. A sample of the supernatant along with a sample of the stock solution was analyzed for its phenol content and the percent phenol removed per 0.1 g resin was calculated. These results are included in Table 1.

TABLE 1

| Selected Properties of TDI-BCD Oligomers | | | |
|---|---|---|---|
| Ratio TDI/BCD | Form Before Water Addition | Pyridine Solubility | % Phenol Removed |
| 1.92 | soluble | soluble | 94% |
| 2.55 | soft gel | insoluble | 94% |
| 3.19 | soft gel | insoluble | 92% |
| 3.84 | harder gel | insoluble | 90% |

These data clearly show that ratios of TDI/BCD less than 2.55 are needed to get the proper differential solubility, and also demonstrate that all oligomers are quite effective in removing phenol from solution.

EXAMPLE II

Large Preparation of BCD Paint (10 g)

In this preparation 10 g of very dry beta-cyclodextrin was dissolved in 55 mL of dry DMF to which was added 2.2 mL of fresh TDI (TDI/BCD mole ratio of 1.41). Following a procedure and workup analogous to that in Example I, 7.45 g of product was recovered (61% yield). The product showed good phenol removal capacity of 84.8%, was very soluble in pyridine and insoluble in water.

EXAMPLE III

Deposition of BCD Paint on Various Surfaces

This series of experiments demonstrate that a variety of complex surfaces could be effectively coated. A 5.0% (w/v) solution of BCD "paint" (see Example II) in pyridine was made up. A variety of materials, including aluminum foil, porous alumina, and steel wool, were coated with this solution. In each case approximately one gram of the material was dipped into 10 mL of the "paint" solution and left there for a few minutes. After this time the material was removed and the excess liquid drained off. The solvent was allowed to thoroughly evaporate leaving behind a thin film of CD polymer. This material was dried and analyzed for total combustible organic material by determining the loss on ignition.

TABLE 2

Coating of Various Surfaces by TDI-Crosslinked BCD

| Material | Depositing Solution Concentration | CD Loading (wt. %) |
|---|---|---|
| Aluminum Foil | 5% | 0.38% |
| Alumina | 5% | 9.8% |
| Steel Wool | 5% | 0.19% |

EXAMPLE IV

Coating of Thin Layer Chromatography Plates

A possible application for a crosslinked cyclodextrin coating is in the area of thin layer chromatography with a ceramic or paper solid phase. In this example either a commercially available silica supported on a glass plate or a piece of commercially available paper was dip coated with a dilute solution of BCD "paint". The material was quickly immersed in a 5% (w/v) solution of the TDI-crosslinked cyclodextrin, the excess was drained, and the solvent was allowed to completely evaporate. The three isomers of nitroaniline were spotted onto the plates and using a mobile phase of methanol/water (50/50) a separation was effected similar to what is reported in the literature when pure cyclodextrin resins are used for this separation. Other multi-component ink dyes were tested, some of which showed clearly different retention patterns compared to the control plates.

EXAMPLE V

Stability of the Coating

A stability test of the TDI-crosslinked BCD coating on alumina was undertaken. In this experiment a coating was formed and then it was subsequently washed with the depositing solvent, and the coating's integrity remeasured.

Experimentally a 1.5 g sample of a high surface area gamma alumina 60/80 mesh was allowed to come in contact for one hour with 10 mL of a 5% (w/v) of BCD "paint" (see Example II) in pyridine. After this time the alumina was filtered off and the pyridine was allowed to evaporate, leaving a thin film of crosslinked cyclodextrin on the alumina surface. This material was then measured for its ability to remove phenol, as a measure of the cyclodextrin loading. After this the support was subjected to a lengthy washing step with pyridine in an attempt to remove the deposited film. After one hour of pyridine washing at room temperature the material was dried and tested for its ability to remove phenol. Finally this material was subjected to a second coating of TDI-crosslinked BCD identical to the first procedure and its capacity was measured with results tabulated below.

TABLE 3

Solvent Resistance of TDI-Crosslinked BCD Coating

| Material | % Phenol Removal |
|---|---|
| Uncoated Alumina | 2.1% |
| Alumina (first coating) | 18.4% |
| Alumina after pyridine stripping | 21.6% |
| Alumina (second coating) | 32.4% |

The data show the coating is very stable and resistant to leach even by the solvent which was used to deposit the film from. Obviously the binding of the film is very strong.

EXAMPLE VI

Chemical Resistance of the Cyclodextrin Film

A series of experiments were undertaken to determine the chemical stability of the film in a variety of environments, aqueous oxidizing and acid. A film of TDI-crosslinked BCD was coated onto an alumina substrate according to the previous procedure and its capacity to remove phenol was measured. This material was then subjected to a variety of washing steps including, 0.1M HCL in 40% ethanol, 1% NaClO, and a pyridine solution. All stripping was carried out with 0.7 g of support and 30 mL of the stripping agent kept at 45° C. for 2 hours. After this time the material was removed and washed and dried and its capacity measured.

TABLE 4

Chemical Resistance of TDI-Crosslinked BCD Coating

| Material | % Phenol Removal |
|---|---|
| Uncoated Alumina | 1.2% |
| Alumina (first coating) | 32.0% |
| Alumina after pyridine stripping | 31% |
| Alumina after HCL/Ethanol stripping | 30% |
| Alumina after NaClO stripping | 30% |

The film appears to be quite stable to aqueous chemically reactive elements. Therefore, this film is quite stable and useful for various applications.

EXAMPLE VII

Synthesis of Other TDI-Crosslinked Cyclodextrins

A dried 1.0 g sample of alpha-cyclodextrin dissolved in 5 mL of dried DMF may be heated to about 100° C. and reacted with 1.5 molar proportions of TDI. The reaction mixture may be maintained at elevated temperature for 10–30 minutes, then cooled and poured into iced water. Solids may be collected by filtration to afford TDI-crosslinked alpha-cyclodextrin. The TDI-crosslinked gamma-cyclodextrin may be prepared in a similar manner.

EXAMPLE VIII

Preparation of Other Polyisocyanate-Crosslinked Cyclodextrin Paint: Determination of the Window for MDI To a solution of 1.0 g of previously dried beta-cyclodextrin in previously dried dimethylformamide maintained at 120°-140° C. was added a solution of varying amounts MDI in DMF. The reaction was heated for 10 minutes, a time determined to be sufficient for gel formation if any were to occur. Table 5 summarizes the pertinent observations.

TABLE 5

| | Properties of MDI-Crosslinked BCD | | |
|---|---|---|---|
| Mole Ratio MDI/BCD | Product Solubility in Reaction Mixture | Pyridine Solubility | Water Solubility |
| .45 | Soluble (no gel) | Soluble | Insoluble |
| .907 | Soluble (no gel) | Soluble | Insoluble |
| 1.35 | gel | Insol. | Insoluble |
| 1.81 | gel | Insol. | insoluble |
| 2.26 | gel | Insol. | Insoluble |
| 2.71 | gel | Insol. | Insoluble |
| 4.08 | gel | Insol. | Insoluble |

These data clearly show that gel formation corresponds to resin insolubility, and that even at low molar proportions of MDI relative to BCD the resin is water insoluble. Hence an upper limit of the molar proportions of MDI to prepare a resin usable in the practice of this invention is something under 1.35.

What is claimed is:

1. A method of coating a solid phase substrate with a polyisocyanate crosslinked cyclodextrin resin comprising contacting a solution of the polyisocyanate crosslinked cyclodextrin resin in a dipolar aprotic solvent with said substrate to afford a wetted substrate, removing the solvent from said wetted substrate to give the substrate coated with the polyisocyanate crosslinked cyclodextrin resin, and recovering the coated substrate, where the polyisocyanate crosslinked cyclodextrin resin is the reaction product of a cyclodextrin with a polyisocyanate in a molar proportion effective to afford said product with a water solubility less than about 200 ppm and with a solubility in at least one dipolar aprotic solvent of at least 0.1 weight percent.

2. The method of claim 1 where the cyclodextrin is alpha-cyclodextrin.

3. The method of claim 1 where the cyclodextrin is gamma-cyclodextrin.

4. The method of claim 1 where the substrate is selected from the group consisting of ceramics, glass, plastics, metals, fabrics, and cellulosic products.

5. The method of claim 4 wherein the substrate is a ceramic selected from the group consisting of refractory inorganic oxides.

6. The method of claim 5 where the refractory inorganic oxide is selected from the group consisting of alumina, titania, silica, magnesia, boria, thoria, zirconia, and combinations thereof.

7. The method of claim 6 where the refractory inorganic oxide is alumina or silica.

8. The method of claim 1 where the cyclodextrin is beta-cyclodextrin.

9. The method of claim 8 where the dipolar aprotic solvent is selected from the group consisting of pyridine, dimethylformamide, dimethylsulfoxide, n-methyl pyrrolidone, hexamethylphosphoramide, and dimethylacetamide.

10. The method of claim 9 where the dipolar aprotic solvent is pyridine, dimethylformamide, dimethylsulfoxide, or any combination thereof.

11. The method of claim 10 where the solvent is pyridine.

12. The method of claim 1 where the polyisocyanate is a diisocyanate selected from the group consisting of toluene diisocyanates, p- and m-phenylene diisocyanate, tetramethylene diisocyanate, 1,6-hexamethylene diisocyanate, 1,4-cyclohexylene diisocyanate, 4,4'-methylenedicyclohexyl diisocyanate, 4,4'-methylenediphenyl diisocyanate, 3,3'-dimethyl-4,4'-diphenylmethane diisocyanate, 1,5-tetrahydramethylene diisocyanate, dianisodine diisocyanate, bitolylene diisocyanate, naphthalene-1,4-diisocyanate, bis(2-methyl-3-isocyanatophenyl)methane, bis(3-methyl-4-isocyanatophenyl)methane, 4,4'-diphenylpropane diisocyanate, and the methylene-bridged polyphenyl polyisocyanates.

13. The method of claim 1 where the diisocyanate is toluene diisocyanate or methylenediphenyl diisocyanate.

14. The method of claim 1 where the polyisocyanate is toluene diisocyanate in a molar proportion between about 1.0 to about 2.5.

15. The method of claim 14 where the molar proportion is between about 1.3 and about 1.9.

16. The method of claim 1 where the polyisocyanate is 4,4'-methylenediphenyl diisocyanate and the molar proportion is between about 0.3 and about 1.3.

17. The method of claim 16 where the molar proportion is between about 0.45 to about .1.10.

18. A solid phase substrate coated with a polyisocyanate crosslinked cyclodextrin resin comprising a solid phase substrate selected from the group consisting of ceramics, glass, plastics, metals, fabrics, and cellulosic products having a coating of from about 0.1 to about 10.0 weight percent based on the finished product of a polyisocyanate crosslinked cyclodextrin resin, said resin being the reaction product of a cyclodextrin with a polyisocyanate in a molar proportion effective to afford said product with a water solubility less than about 200 ppm and with a solubility in at least one dipolar aprotic solvent of at least 0.1 weight percent.

19. The substrate of claim 18 where the cyclodextrin is beta-cyclodextrin.

20. The substrate of claim 18 where the cyclodextrin is alpha-cyclodextrin.

21. The substrate of claim 18 where the cyclodextrin is gamma-cyclodextrin.

22. The substrate of claim 18 where the substrate is a ceramic selected from the group consisting of refractory inorganic oxides.

23. The substrate of claim 22 where the refractory inorganic oxide is selected from the group consisting of alumina, titania, silica, magnesia, boria, thoria, zirconia, and combinations thereof.

24. The substrate of claim 23 where the refractory inorganic oxide is alumina or silica.

25. The substrate of claim 18 where the polyisocyanate is a diisocyanate selected from the group consisting of toluene diisocyanates, p- and m-phenylene diisocyanate, tetramethylene diisocyanate, 1,6-hexamethylene diisocyanate, 1,4-cyclohexylene diisocyanate, 4,4'- methylenedicyclohexyl diisocyanate, 4,4'-methylenediphenyl diisocyanate, 3,3'-dimethyl-4,4'-diphenylmethane diisocyanate, 1,5-tetrahydramethylene diisocyanate, dianisodine diisocyanate, bitolylene diisocyanate, naphthalene-1,4-diisocyanate, bis(2-methyl-3-isocyanatophenyl)methane, bis(3-methyl-4-isocyanatophenyl)methane, 4,4'-diphenylpropane diisocyanate, and the methylene-bridged polyphenyl polyisocyanates.

26. The substrate of claim 25 where the diisocyanate is toluene diisocyanate or methylenediphenyl diisocyanate.

27. The substrate of claim 18 where the polyisocyanate is toluene diisocyanate in a molar proportion between about 1.0 to about 2.5.

28. The substrate of claim 27 where the molar proportion is between about 1.3 and about 1.9.

29. The substrate of claim 18 where the polyisocyanate is 4,4'-methylenediphenyl diisocyanate and the molar proportion is between about 0.3 and about 1.3.

30. The substrate of claim 29 where the molar proportion is between about 0.45 to about 1.10.

31. The substrate of claim 18 where the solution of a cyclodextrin is in a non-polar aprotic solvent selected from the group consisting of pyridine, dimethylformamide, dimethylsulfoxide, N-methylpyrrolidone, hexamethylphosphoramide, dimethylsulfoxide, and combinations thereof.

32. The substrate of claim 31 where the non-polar aprotic solvent is pyridine, dimethylformamide, dimethylsulfoxide, or any combination thereof.

33. The substrate of claim 32 where the solvent is pyridine.

* * * * *